United States Patent
Barbehenn et al.

[19]

[11] Patent Number: 5,914,865
[45] Date of Patent: Jun. 22, 1999

[54] SIMPLIFIED AC-DC SWITCHING CONVERTER WITH OUTPUT ISOLATION

[75] Inventors: George Barbehenn; Huston W Rice, both of Vancouver, Wash.

[73] Assignee: Hewlett-Packard Company, Palo Alto, Calif.

[21] Appl. No.: 08/956,973

[22] Filed: Oct. 23, 1997

[51] Int. Cl.$^6$ .................................................. H02M 3/335
[52] U.S. Cl. ................... 363/21; 363/97; 323/902
[58] Field of Search ................... 363/18, 19, 20, 363/21, 56, 97, 132; 323/902

[56] References Cited

U.S. PATENT DOCUMENTS

| | | | |
|---|---|---|---|
| 4,037,271 | 7/1977 | Keller | 363/21 |
| 5,089,752 | 2/1992 | Pacholok | 315/307 |
| 5,184,290 | 2/1993 | Ozawa et al. | 363/21 |
| 5,289,360 | 2/1994 | Canova | 363/21 |
| 5,450,304 | 9/1995 | Cox | 363/21 |
| 5,475,579 | 12/1995 | John et al. | 363/21 |
| 5,694,305 | 12/1997 | King et al. | 363/21 |
| 5,729,448 | 3/1998 | Haynie et al. | 363/97 |

*Primary Examiner*—Adolf Deneke Berhane

[57] ABSTRACT

An AC-DC switching converter converts AC mains power into regulated DC power into a load. It is desired to electrically isolate the load from the mains, and this requires isolation in both the forward power transfer path and the reverse feedback path. The forward path is isolated by use of a transformer, and the feedback signal is transferred through an optocoupler. In a typical pulsewidth modulation control loop design, it is difficult to achieve good loop dynamics when using low cost optocouplers, because of the wide variation of their transfer function gain. However, in the disclosed invention, the loop is operated as a nonlinear limit cycle ("bang—bang") controller. In this mode, the optocoupler gain variation has an insignificant effect on loop operation. The converter switching signal is provided by an inexpensive 555 timer oscillator, and the optocoupler is connected to the reset pin of this timer to turn it ON and OFF in short bursts, as is characteristic of this type of controller. Since a converter must operate over a mains voltage range of about 3:1, the disclosure also includes a technique for protecting the transformer from possible saturation by narrowing the oscillator pulses as an inverse function of the mains voltage.

17 Claims, 2 Drawing Sheets

SIMPLIFIED AC-DC SWITCHING CONVERTER WITH OUTPUT ISOLATION

BACKGROUND AND PRIOR ART

The field of switching power converters is a rich one, with many classes of inventions spanning several decades. The present disclosure belongs to the class of AC-DC converters in which AC power is input from supply mains, converted to high voltage DC, then switched through a transformer and rectified to supply regulated DC power which is electrically isolated from the mains for safety. Switching frequencies are much higher than the mains frequencies, ranging from tens of kilohertz to several megahertz.

Regulating the DC output voltage against load and mains variations requires a feedback control system to sample the output and to control the applied power in an appropriate manner to counter such variations in cases where the output is electrically isolated from the mains, providing feedback for the control system is complicated by the requirement of maintaining very high impedance (ideally, infinite) between input and output sections of the converter. Because of this isolation, sometimes regulator circuits are designed which sample and regulate the transformer input. But this puts the transformer and following rectifier outside the control loop, raising the output impedance of the converter and degrading the regulation. So, for sampling the output itself, it is common practice to communicate the state of the output voltage by transformer or optical coupling to the input section. Recent practice has favored the use of optical signal-couplers (usually called "optocouplers"), which are small and inexpensive and which have a frequency response extending to DC.

The most common technique for varying the applied power is to control the duty cycle of the switching waveform (ie, pulsewidth modulation). When the output voltage drops, the control system adjusts the pulsewidth to supply more power to the load, and conversely for a rising output voltage. Such a control system is a sampled-data system operating in a linear mode. The sampling rate is the frequency of the switching waveform. Putting an optocoupler in the feedback complicates the loop design because optocouplers exhibit rather large variations of transfer function gain from unit to unit. (Optocouplers consist of a combination of a light emitting diode and a phototransistor, often with wide production variations in the characteristics of each element). The gain variation can be as high as 4:1 in a batch of modest cost units, and this fact usually requires designing the control loop to have less than optimum gain in order to insure stability. Lower loop gain implies, of course, more output voltage variation and slower transient response. The alternatives are either tight specifications on the optocoupler or a variable gain control, either of which defeats the important goal of achieving low cost in mass-produced products.

Clearly, what is needed for isolated converters is a way to use inexpensive optocouplers in a "tight" and fast controller circuit.

SUMMARY OF THE INVENTION

The invention disclosed herein operates in a non-linear, limit cycle mode, sometimes called "bang-bang" control. This means that the applied power is either furnished at maximum rate to the load filter, or it is turned off altogether. The control system alternates between these states by utilizing an inhibit connection to the oscillator which supplies the switching signal. By using an optocoupler to generate the inhibit signal, a small voltage variation across the load will turn the oscillator on and off. In the preferred embodiment to be described, a common 555 timer circuit is configured as a free-running oscillator. This device includes an inhibit line (labeled "reset" on 555 data sheets) and only a few millivolts separate the oscillation ON and OFF regions of the voltage applied to this line. The optocoupler provides this reset voltage and the circuit gain reduces the ON-OFF transition to a few millivolts, from the viewpoint of the load voltage. Variations in the gain of the optocoupler do not affect loop stability as would happen in a linear, pulsewidth modulated conventional circuit. Rather, more gain is favorable for reducing the peak-to-peak load voltage variation needed to effect the ON-OFF transitions of the oscillator.

Because a bang-bang control loop can be built with very little filtering, it is inherently very fast and responds quickly to load and line variations.

The DC voltage converted from the mains can vary over a typical range of 120–350 volts. Even though the controller can easily regulate the load voltage over this input range by varying the duration of oscillator ON intervals, a high voltage per cycle may cause undue stress on the circuit components and, in particular, could cause the switched transformer to saturate. The preferred embodiment includes a means of protecting the transformer against such voltage variations. Usually, the waveform of a 555 type oscillator is nearly constant over variations of supply voltage, temperature, etc. However, in this embodiment, the width of an oscillator half cycle is inversely related to the mains supply such that the width decreases with increasing mains voltage, thus reducing the peak magnetizing transformer current.

BRIEF DESCRIPTION OF THE DRAWINGS

The invention is further described by way of example with reference to the accompanying drawings in which.

DETAILED DESCRIPTION OF A PREFERRED EMBODIMENT

Figure 1:
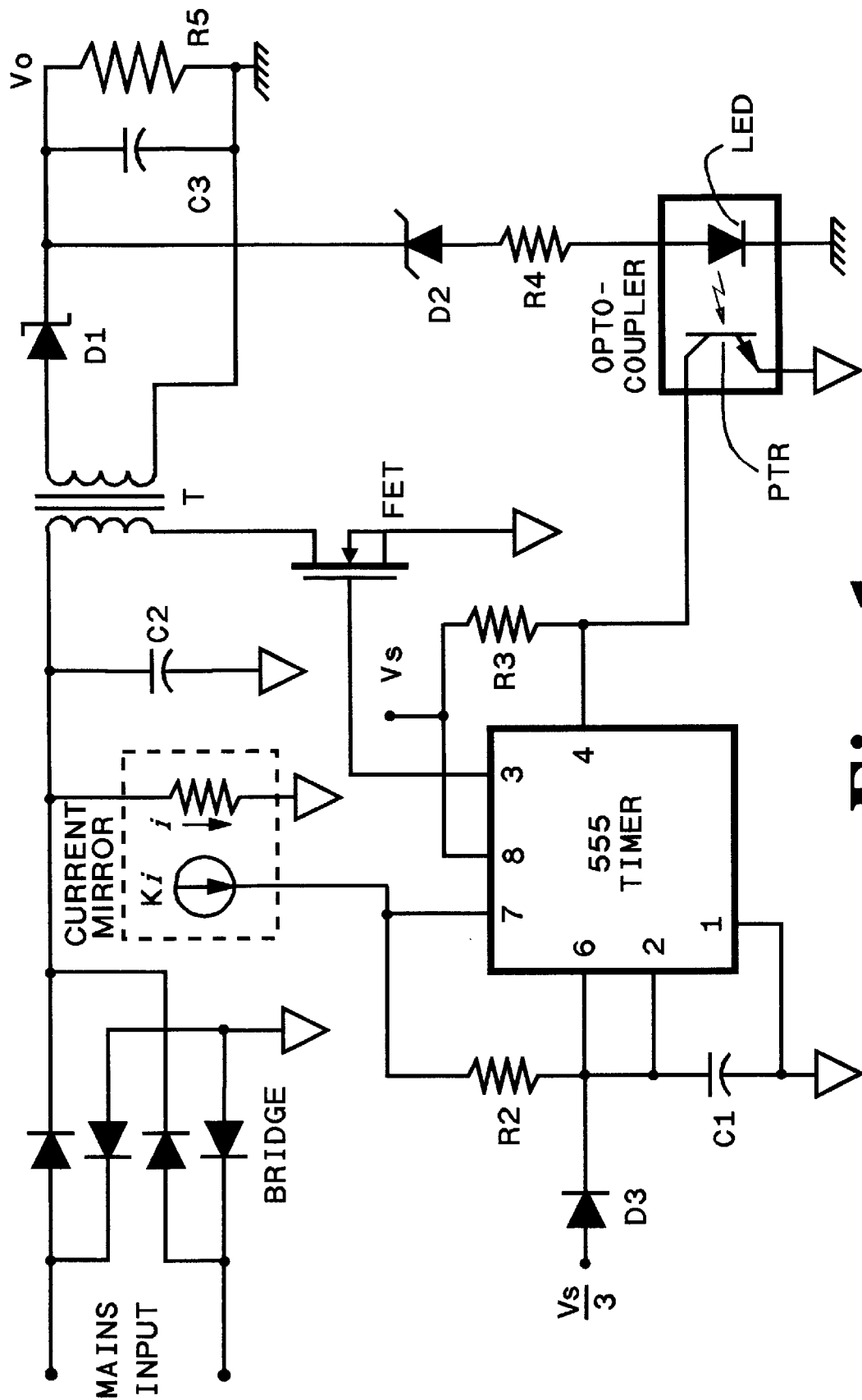
FIG. 1 is a simplified circuit diagram of an AC-DC converter in accordance with the disclosure.

Referring now to FIG. 1, the AC mains connect to a full wave diode BRIDGE which converts the AC to high voltage DC, typically in the range of 120–350 volts because the peak value of the mains voltage is stored in capacitor C2. This DC voltage is applied to the upper primary connection of transformer T. However, current flow through the primary may be either enabled or interrupted by the switching device FET, an N-channel field-effect power transistor connected between the lower primary connection and input (mains) ground. The secondary voltage of transformer T is rectified by Schottky diode D1, filtered by C3, and applied to the DC load, represented by resistor R5. Transformer T allows load R5 to be electrically isolated from the mains, and this isolation is indicated by a different symbol for ground on the lower connection of R5.

Pin 3 drives the gate of the FET with a high frequency square wave signal generated by the 555 TIMER integrated circuit and its associated circuitry. As is well known, the frequency of the 555 TIMER is governed by an approximately triangular waveform developed across C1, which is charged by the current Ki of the CURRENT MIRROR, and discharged through R2 via discharge pin 7. The positive portion of a square wave period at pin 3 coincides with charging C1, and, conversely, the negative portion is coincident with the discharge of C1. Since the FET is N-channel, the positive portion turns it on and allows current flow in the primary of transformer T.

The CURRENT MIRROR is shown symbolically in order to keep the figure uncluttered. Current mirror circuits are a well known art. Output current Ki is proportional to the input current i, and is nominally equal to it, since K is here set to unity. CURRENT MIRROR provides protection against possible high voltage being applied to the 555 TIMER, as later explained.

Diode D3 is connected as a clamp across C1, preventing its voltage from falling lower than a diode drop below the 555 TIMER trigger voltage, which is internally set at ⅓ the supply voltage Vs. A typical value for Vs is +12 volts. This clamping is a common technique for preventing the initial pulse in a burst from having a longer duration than the others. This is further explained later.

(Comprehensive design information about the industry-standard 555 TIMER circuit may be found, for example, in the data sheet for the Signetics ICM7555 general purpose CMOS timer.)

R3, R4, the OPTO-COUPLER, and Zener diode D2 are circuit components of the feedback control loop. This loop exerts its control over the power delivered to C3 by varying the voltage on reset pin 4 of the 555 TIMER. The voltage range on pin 4 can be divided into three regions with respect to input ground on pin 1: ON (normal operation), threshold, and OFF (reset). The threshold region is narrow—typically 10 and 20 millivolts—and is centered at approximately 0.7 volts. When the voltage on pin 4 is in the OFF region below the threshold, oscillation stops and the FET gate drive signal on pin 3 remains at input ground. This keeps the FET nonconductive and prevents primary current flow in transformer T. When the voltage on pin 4 is in the ON region above the threshold, the 555 TIMER oscillates without restraint.

Operation of the circuit may be explained as follows. On startup, the 555 TIMER begins oscillating at a frequency and duty cycle determined by CURRENT MIRROR, R2, C1, and its internal trigger and threshold voltages. The circuit parameters are chosen such that more power is supplied to C3 than is required to replenish the maximum power dissipated in the load R5. The essential parameters included in this choice are the duty cycle of the oscillator and the transformer turns ratio which, together, determine how much energy per cycle is pumped into filter capacitor C3. The pulses of energy are absorbed in C3 which then supplies smoothed power to R5. Because more energy is supplied than R5 dissipates, the voltage Vo across R5 increases slowly (with respect to the duration of an oscillator cycle). At some point in time, Vo exceeds a predetermined value, which is approximately the sum of the Zener voltage of diode D2 and the turn-on voltage of the light emitting diode LED in the OPTO-COUPLER. When this happens, LED begins conducting and emitting light. This, in turn, causes the adjacent photo-transistor PTR to begin conduction. The collector current of PTR flows through R3 and thus lowers the voltage on reset pin 4 of the 555 TIMER. When this voltage falls below the threshold, oscillation is inhibited and no further pulses of energy are supplied to C3. Since C3 alone is now supplying power to R5, voltage Vo begins to fall until, via the OPTO-COUPLER feedback connection, the voltage on reset pin 4 rises above the threshold and oscillation resumes.

Figure 3:
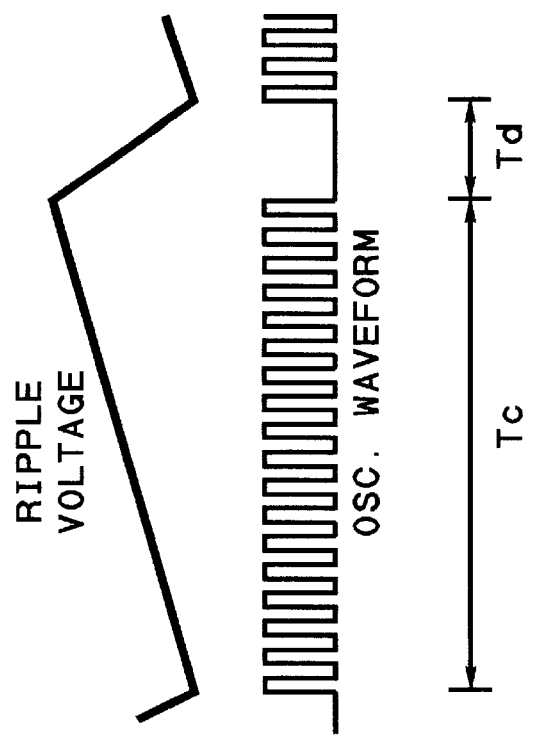
FIG. 3 is a diagram showing the waveforms and time relationship of the load ripple voltage and the oscillator, for the case of a heavy load.
Figure 2:
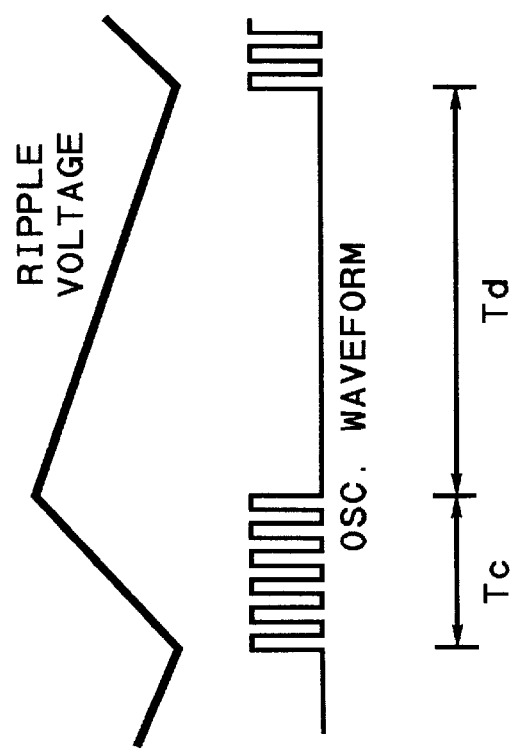
FIG. 2 is a diagram showing the waveforms and time relationship of the load ripple voltage and the oscillator, for the case of a light load.

Repetition of the circuit operation described above causes a ripple voltage of approximately sawtooth shape to appear on the load voltage Vo. FIG. 2 shows a typical ripple voltage for the case of light load (large R5). FIG. 3 shows the case of a heavy load (small R5). in both figures, Tc represents the interval of energy buildup in C3 (when the 555 TIMER is oscillating), and Td is the discharge interval (when C3 alone supplies power to R5). The figures also show the ON and OFF oscillator waveforms on the same time scale.

In the circuit operation described above, the OPTO-COUPLER functions as a comparator, rather than as a linear transfer-function device, which would be its function in a conventional pulsewidth modulated converter. That is, the role of the OPTO-COUPLER and its associated components is to traverse the oscillator threshold region with enough gain so that the amplitude of the ripple voltage has an acceptable upper bound. Provided that an OPTO-COUPLER with minimum gain from the tolerance spread meets this criterion, units with higher gain will certainly meet it. Thus, unlike the case of a linear control loop, the variation of gain from unit to unit is of little consequence when used as disclosed herein.

The peak-to-peak value of the ripple waveform may readily be estimated. The bang-bang control loop causes the reset voltage on pin 4 to vary back and forth between the ON and OFF regions, just straddling the threshold region. If the width of the reset threshold region is $V_{th}$, then translating this region to the output Vo gives the sawtooth magnitude:

$$V_{p\text{-}p} = V_{th} \cdot R_{oc} \cdot (R4/R3)$$

where $V_{p\text{-}p}$ is the peak-to-peak value of the sawtooth waveform, and $R_{oc}$ is the current transfer ratio of the OPTO-COUPLER Another feature of the preferred embodiment protects circuit components, particularly transformer T, from high mains input voltage. High values of mains voltage cause correspondingly high values of the DC voltage applied to the primary of transformer T and also larger pulses of charge into C3. This does not much affect the voltage regulator action; waveform segments Tc of FIG. 2 and FIG. 3 are thus both steeper, and the control loop simply shortens these segments to maintain Vo at the predetermined level. However, this higher voltage may cause considerable stress in transformer T. Applying a voltage pulse to a transformer causes a triangular waveform of magnetizing current whose peak value is proportional both to the duration of the pulse and to its amplitude. Hence a high voltage pulse may drive the magnetizing current of transformer T into the saturation region, causing rapid current growth and possible failure of the transformer, switch, and other circuit elements.

In FIG. 1, a current i, proportional to the high voltage DC from BRIDGE, flows to the input of the CURRENT MIRROR. The dependent source Ki of the mirror circuit provides the charging current for C1, and this determines the duration of the positive portion of the FET drive waveform at pin 3. Hence, increasing the high voltage DC increases the charging current, which, in turn, decreases the duration of the positive portion. This is exactly what is needed to limit the magnetizing current of transformer T.

It is possible, of course, to supply the charging current directly with a large resistor from the high voltage DC to R2 and pin 7. But this may result in excessive voltage on pin 7 when the discharge transistor attached to this pin is turned off, and 555 TIMER could be damaged or destroyed. Using a current source provides a convenient way to restrict the open circuit voltage on pin 7 to a safe value by limiting the voltage range of the dependent source Ki.

The above-described concern for limiting the increase in magnetizing current also motivates the inclusion of clamp diode D3. During sustained oscillation, the voltage across C1 varies between $1/3$ Vs and $2/3$ Vs. However, when oscillation is inhibited by an OFF voltage on reset pin 4, C1 discharges completely. Then, when oscillation is again enabled, C1 must charge from zero to $2/3$ Vs during the first cycle, making the first half cycle nearly twice as long as normal. To avoid the excess magnetizing current which this would cause, C1 is clamped slightly below $1/3$ Vs, resulting in a near-normal initial half cycle.

Although the invention has been titled and illustrated in terms of an AC-DC converter, it is clear that the inventive principles work just as well in a DC-DC converter; that is, in which the primary source of energy is DC—for instance, from a battery—and it is desired to convert this energy into a regulated DC voltage across a load which must be electrically isolated from the source. In FIG. 1, such a converter would be illustrated by removing the mains input and the BRIDGE circuit and substituting a DC energy source, with high level and low level (eg., plus and ground) terminal connections, in their place.

We have described and illustrated the principles of our invention with reference to a preferred embodiment; however, it will be apparent that the invention can be modified in arrangement and detail without departing from such principles. For instance, instead of using an oscillator's inhibit control line to control oscillation, a logic gate connected to the optoisolator and the oscillator could effectively create the desired bursts of waveform from a continuously running oscillator. Again, instead of an optoisolator, one could use an operational amplifier with high input impedance and a very high (around 400 volt) common mode range. Thus, it will be recognized that the detailed embodiment is illustrative only, and should not be taken as limiting the scope of our invention. Rather, we claim as our invention all such variations as may fall within the scope and spirit of the following claims and equivalents thereto.

We claim:

1. In an AC-DC converter for converting an AC mains voltage input into a DC output voltage across a load, the converter being of the pulse-switching, limit-cycle type, and the load being electrically isolated from the AC mains, a method of regulating the DC output voltage, comprising the steps of:

sensing the DC output voltage with the input of a comparator having input-output isolation;

coupling the output of the comparator to an ON/OFF control input of an oscillator which provides a switching signal for the AC-DC converter; and adjusting the comparator to turn OFF the oscillator whenever the DC output voltage exceeds a threshold region around a predetermined voltage value and, conversely, to turn ON the oscillator whenever the DC output voltage falls below the threshold region.

2. In an AC-DC converter as recited in claim 1, the comparator further comprising an opto-coupler circuit.

3. In an AC-DC converter as recited in claim 1, the further steps of:

sensing a DC voltage proportional to the AC mains voltage;

adjusting the pulsewidth of the oscillator according to an inverse function of the magnitude of the DC voltage.

4. In an AC-DC converter as recited in claim 3, the sensing step further comprising generating a direct current proportional to the AC mains voltage, and the adjusting step further comprising controlling, with the direct current, the charge on a timing capacitor of the oscillator, thereby reducing the oscillator pulsewidth for increased direct current.

5. in an AC-DC converter as recited in claim 4, the adjusting step further comprising supplying the direct current to the timing capacitor.

6. In an AC-DC converter as recited in claim 4, the adjusting step further comprising supplying the direct current to the input of a current mirror whose output current is supplied to the timing capacitor.

7. In an AC-DC converter for converting an AC mains voltage input into a DC output voltage across a load, the converter being of the pulse-switching, limit-cycle type, having an oscillator for switching rectified AC mains voltage through a transformer coupled to the load, a method of limiting the transformer magnetizing current at high mains voltages, comprising the steps of:

sensing the rectified AC mains voltage; and adjusting the pulsewidth of the oscillator according to an inverse function of the magnitude of the rectified AC mains voltage.

8. In an AC-DC converter as recited in claim 7, the oscillator further having an input responsive to direct current control signals for adjusting its pulsewidth, such that increasing a direct current control signal to this input reduces the pulsewidth.

9. In an AC-DC converter as recited in claim 8, the sensing step further comprising generating a direct current proportional to the rectified AC mains voltage, and the adjusting step further comprising supplying the direct current to the input of the oscillator.

10. In an AC-DC converter as recited in claim 8, the sensing step further comprising generating a direct current proportional to the rectified AC mains voltage, and the adjusting step further comprising supplying the direct current to an input of a current mirror whose output is supplied to the input of the oscillator.

11. An AC-DC converter of the pulse-switching, limit-cycle type for converting an AC mains input voltage into a DC output voltage across a load, the load being electrically isolated from the AC mains, the converter comprising:

a bridge circuit for converting the AC mains voltage to a high voltage DC, having an input connected to the mains, an output, and a ground return;

a transformer having a first side of a primary winding connected to the bridge output, a second side of the primary winding, and a secondary winding;

a SPST switch connected between the second side of the primary winding and the ground return, and having a control input;

an oscillator circuit having a pulse output coupled to the control input of the switch, and an ON/OFF control input for governing the oscillation of the oscillator circuit;

a rectifier and filter circuit coupled to the transformer secondary for converting pulsed secondary voltage into the DC output voltage; and a comparator circuit providing electrical isolation between an input coupled to the DC output voltage, and an output coupled to the oscillator ON/OFF control input;

whereby the comparator circuit, sensing the proximity of the DC output voltage to a predetermined voltage value, switches the oscillator ON and OFF, causing the DC output voltage to vary continually in a small range around the predetermined voltage value.

12. An AC-DC converter, as recited in claim 11, wherein the comparator circuit comprises an opto-coupler.

13. An AC-DC converter, as recited in claim 11, further comprising:

the oscillator circuit having, in addition to the ON/OFF control input, a second control input for controlling the oscillator pulsewidth; and a sensing circuit, having an input coupled to the high voltage DC and an output coupled to the second control input of the oscillator for controlling its pulsewidth; whereby the oscillator pulsewidth decreases as the mains voltage increases.

14. An AC-DC converter, as recited in claim 13, wherein the sensing circuit comprises a current mirror.

15. A DC-DC converter of the pulse-switching, limit-cycle type for converting energy input from a DC source, having high level and low level terminals, into a DC output voltage across a load which is electrically isolated from the DC source, the converter comprising:

a transformer having a first side of a primary winding connected to the high level terminal, a second side of the primary winding, and a secondary winding;

a SPST switch connected between the second side of the primary winding and the low level terminal, and having a control input;

an oscillator circuit having a pulse output coupled to the control input of the switch, and an ON/OFF control input for governing the oscillation of the oscillator circuit;

a rectifier and filter circuit coupled to the transformer secondary for converting pulsed secondary voltage into the DC output voltage; and a comparator circuit providing electrical isolation between an input coupled to the DC output voltage, and an output coupled to the oscillator ON/OFF control input; whereby the comparator circuit, sensing the proximity of the DC output voltage to a predetermined voltage value, switches the oscillator ON and OFF, causing the DC output voltage to vary continually in a small range around the predetermined voltage value.

16. A DC-DC converter, as recited in claim 15, further comprising:

the oscillator circuit being of a type having a controllable pulsewidth; and a sensing circuit, having an input coupled to the DC source and an output coupled to the oscillator for controlling its pulsewidth, whereby the pulsewidth decreases as the DC source voltage increases.

17. A DC-DC converter, as recited in claim 15, wherein the comparator circuit comprises an opto-coupler.

* * * * *